United States Patent
Fan et al.

(10) Patent No.: US 12,451,909 B1
(45) Date of Patent: Oct. 21, 2025

(54) INTER-BAND CARRIER AGGREGATION CIRCUIT

(71) Applicant: Tiantong Ruihong Technology Co., Ltd., Jiaxing (CN)

(72) Inventors: Xiaofei Fan, Jiaxing (CN); Xuexiao Jin, Jiaxing (CN); Dejin Zhu, Jiaxing (CN); Daijun Liu, Jiaxing (CN); Wei Zhang, Jiaxing (CN); Shenglei Xiao, Jiaxing (CN)

(73) Assignee: Tiantong Ruihong Technology Co., Ltd., Jiaxing (CN)

( * ) Notice: Subject to any disclaimer, the term of this patent is extended or adjusted under 35 U.S.C. 154(b) by 0 days.

(21) Appl. No.: 19/027,203

(22) Filed: Jan. 17, 2025

(30) Foreign Application Priority Data

Jun. 17, 2024 (CN) .......................... 202410773428.3

(51) Int. Cl.
*H04B 1/52* (2015.01)
*H04B 1/00* (2006.01)

(52) U.S. Cl.
CPC ......... *H04B 1/0078* (2013.01); *H04B 1/0057* (2013.01)

(58) Field of Classification Search
CPC ............................ H04B 1/0078; H04B 1/0057
USPC ...................................................... 455/552.1
See application file for complete search history.

(56) References Cited

U.S. PATENT DOCUMENTS

2018/0019768 A1* 1/2018 King .................. H04L 27/0002

FOREIGN PATENT DOCUMENTS

| CN | 107453858 A | 12/2017 |
|---|---|---|
| CN | 116318233 A | 6/2023 |
| JP | 2018074562 A | 5/2018 |
| JP | 2019154025 A | 9/2019 |
| TW | 202308323 A | 2/2023 |

OTHER PUBLICATIONS

Notification to Grant Patent dated Jul. 24, 2024 for correspondence Chinese Application No. 202410773428.3.
Tseng et al., Design of SAW Filter and Multiplexer Module for 5G Carrier Aggregation, 2020 IEEE Asia-Pacific Microwave Conference (APMC 2020) | 978-1-7281-6962, IEEE | DOI: 10.1109/APMC47863.2020.9331726.

(Continued)

*Primary Examiner* — Tanmay K Shah
(74) *Attorney, Agent, or Firm* — K&L Gates LLP

(57) ABSTRACT

Provided is an inter-band carrier aggregation circuit including a radio frequency transceiver, a power amplifier module, a signal filtering module, an antenna switch and an antenna. The power amplifier module is configured to perform an amplification processing on a carrier aggregation signal output by the radio frequency transceiver to obtain an aggregate amplified signal. The signal filtering module is configured to filter the aggregate amplified signal, the signal filtering module includes at least one multiplexer, the multiplexer is integrated by at least two single-frequency-band duplexers or filters, and the multiplexer includes a transmitting end, a receiving end and an antenna end. By means of the method, the use, layout area, line insertion loss and power consumption of each discrete device in the inter-band carrier aggregation circuit are reduced, and thus the overall cost of the circuit is reduced.

9 Claims, 3 Drawing Sheets

(56) References Cited

OTHER PUBLICATIONS

Zou Hongyu, Technologies for Multi-Band RF Broadband Channels, A Master Thesis Submitted to University of Electronic Science and Technology of China, School of Aeronautics and Astronautics, Apr. 12, 2024-May 30, 2023, pp. 1-97.

* cited by examiner

INTER-BAND CARRIER AGGREGATION CIRCUIT

CROSS-REFERENCE TO RELATED APPLICATION(S)

This application claims priority to Chinese Patent Application No. 202410773428.3 filed with the China National Intellectual Property Administration (CNIPA) on Jun. 17, 2024, the disclosure of which is incorporated herein by reference in its entirety.

TECHNICAL FIELD

The present disclosure relates to the field of communication technologies, and in particularly, to an inter-band carrier aggregation circuit.

BACKGROUND

At present, in a case where the multi-mode and multi-frequency-band communication network occupies the large amount of spectrum resources, in order to improve the data transmission rate and reasonably use the spectrum resources, according to Shannon's theorem, the large continuous range of bandwidth is required as the channel for data transmission, and an ultra-wideband continuous spectrum is difficult to acquire. In the current radio frequency front-end system, in order to obtain the relatively wide continuous bandwidth, the carrier aggregation (CA) technology is often used to splice fragmented signals distributed on different frequency bands into a virtual large bandwidth, so that the data is transmitted at the faster rate. In the 5G era, the user's demand for high-rate network experience is further released, in order to improve the utilization of the spectrum resources and uplink and downlink rates, the CA technology becomes an important technical means. The carrier aggregation is divided into an in-band contiguous carrier aggregation, an in-band non-contiguous carrier aggregation, and an inter-band carrier aggregation.

For the inter-band CA, the application of the uplink inter-band CA is limited because a long term evolution (LTE) terminal supports only a single transmission in the 4G era. Up to the 5G era, most of the terminals support a dual transmission in the uplink, and an uplink inter-band carrier aggregation condition is possessed by hardware. At present, in the terminal product, power amplifiers (PAs) are all of single frequency bands, the PA can only work in the same frequency band at the same moment, and at least two PAs need to be started simultaneously during the inter-band CA, so that the power consumption and the area of the radio frequency front-end chip may be significantly increased.

SUMMARY

An embodiment of the present disclosure provides an inter-band carrier aggregation circuit, which achieves the effect of reducing the use, layout area and line insertion loss of various discrete devices, and reducing the overall cost of the circuit.

In a first aspect, an embodiment of the present disclosure provides an inter-band carrier aggregation circuit. The inter-band carrier aggregation circuit includes a radio frequency transceiver, a power amplifier module, a signal filtering module, an antenna switch and an antenna. The power amplifier module is connected in series between the radio frequency transceiver and the signal filtering module, and the power amplifier module is configured to perform an amplification processing on a carrier aggregation signal output by the radio frequency transceiver to obtain an aggregate amplified signal, where the carrier aggregation signal includes signals of at least two different frequency bands. The signal filtering module is connected in series between the power amplifier module and the antenna switch, the antenna switch is connected to the antenna, the signal filtering module includes at least one multiplexer integrated by at least two single-frequency-band duplexers or filters, the multiplexer includes a transmitting end, a receiving end and an antenna end, and the signal filtering module is configured to filter the aggregate amplified signal and transmit carrier aggregation signal obtaining by filtering to the antenna through the antenna switch.

According to the inter-band carrier aggregation circuit provided in the embodiment of the present disclosure, the inter-band carrier aggregation circuit includes the radio frequency transceiver, the power amplifier module, the signal filtering module, the antenna switch and the antenna. The power amplifier module is connected in series between the radio frequency transceiver and the signal filtering module, and the power amplifier module is configured to perform the amplification processing on the carrier aggregation signal output by the radio frequency transceiver to obtain the aggregate amplified signal, where the carrier aggregation signal includes the signals of the at least two different frequency bands. The signal filtering module is connected in series between the power amplifier module and the antenna switch, the antenna switch is connected to the antenna, the signal filtering module includes the at least one multiplexer integrated by the at least two single-frequency-band duplexers or filters, the multiplexer includes the transmitting end, the receiving end and the antenna end, and the signal filtering module is configured to filter the aggregate amplified signal and transmit the carrier aggregation signal obtaining by filtering to the antenna through the antenna switch. According to the above-described technical solutions, multiple single-frequency-band discrete duplexers are integrated into a multiplexer with one transmitting end, one receiving end and one antenna end, and the inter-band carrier aggregation can be achieved based on a circuit including the multiplexer, so that the use of various discrete devices, the required device layout area, the line insertion loss, and the energy consumption of the circuit are reduced, and thus the overall cost of the circuit is reduced.

It is to be understood that the contents described in this section are not intended to identify key or critical features of the embodiments of the present disclosure, nor intended to limit the scope of the present disclosure. Other features of the present disclosure will be readily understood from the following Description.

BRIEF DESCRIPTION OF DRAWINGS

In order to describe technical solutions in embodiments of the present disclosure or in the related art more clearly, the drawings used for describing the embodiments will be briefly introduced below. Apparently, the drawings in the following description are merely some embodiments of the present disclosure. For those of ordinary skill in the art, other drawings may also be obtained without creative labor according to these drawings.

DETAILED DESCRIPTION

In order that those skilled in the art will better understand the solutions of the present disclosure, the technical solutions adopted, and the technical effects to be achieved by the present disclosure, the technical solutions of embodiments of the present disclosure will be clearly and completely described below in conjunction with the accompanying drawings of the embodiments of the present disclosure. Apparently, the described embodiments are merely some embodiments of the present disclosure, rather than all of the embodiments. All other embodiments obtained by those of ordinary skill in the art based on the embodiments of the present disclosure without needing creative efforts shall all fall in the scope of protection of the present disclosure.

It is to be noted that the terms "first", "second" and the like in the Description and claims of the present disclosure, and in the foregoing drawings, are used for distinguishing between similar objects and not necessarily for describing a particular order or sequential order. It is to be understood that the data so used are interchangeable as appropriate so that the embodiments of the present disclosure described herein can be implemented in an order other than those illustrated or described herein. Moreover, the terms "include" and "have" as well as any variations thereof, are intended to cover a non-exclusive inclusion, for example, a process, a method, a system, a product, or a device that includes a series of steps or units is not necessarily limited to those steps or units expressly listed, but may include other steps or units not expressly listed or inherent to such process, method, product, or device.

Figure 1:
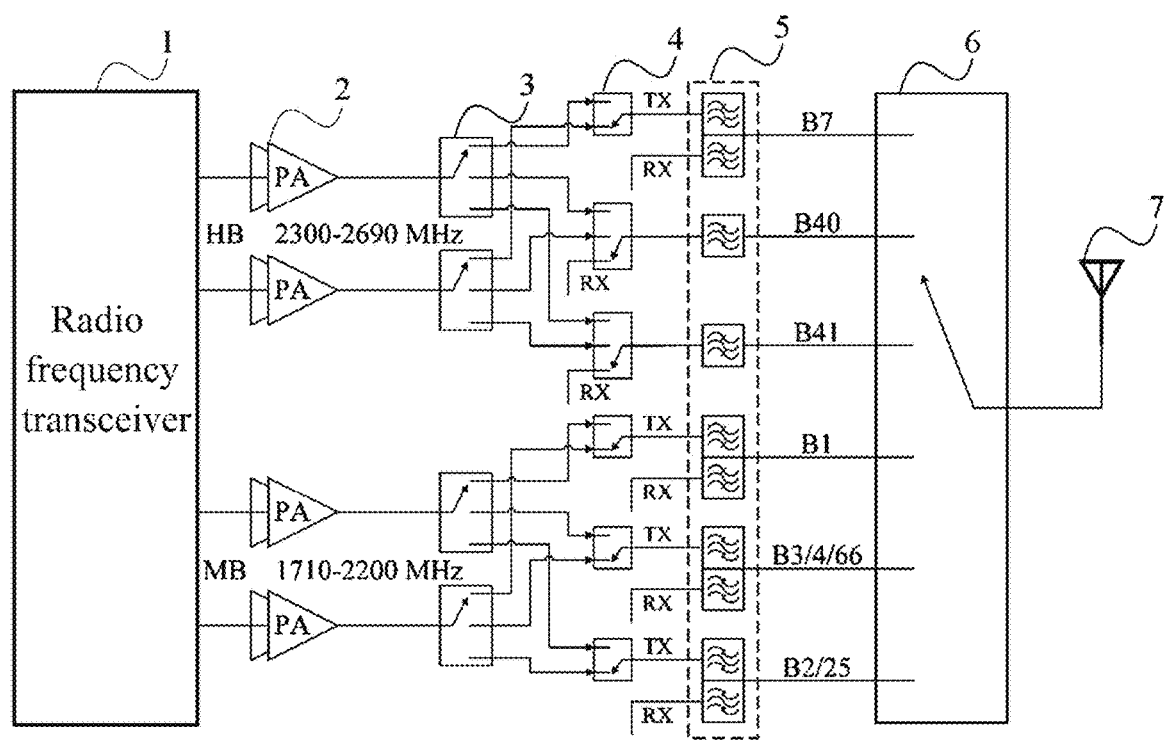
FIG. 1 is a diagram showing an example of an inter-band carrier aggregation circuit in the related art.

It can be known that power amplifiers in a terminal product are all of single frequency bands at present, an inter-band carrier aggregation can only work in the same frequency band at the same moment, and at least two power amplifiers need to be started simultaneously during the inter-band carrier aggregation, so that the power consumption and the area of the radio frequency front-end chip may be significantly increased. FIG. 1 is a diagram showing an example of an inter-band carrier aggregation circuit in the related art. As shown in FIG. 1, the inter-band carrier aggregation circuit consists of a radio frequency transceiver 1, a power amplifier 2, an amplifier switch 3, a filter switch 4, a filter 5, an antenna switch 6 and an antenna 7. The mid-frequency band number involved in the inter-band carrier aggregation mainly include B1, B2, B3, B4, B25 and B66, and the high-frequency band number involved in the inter-band carrier aggregation mainly include B7, B40 and B41. An existing inter-band carrier aggregation circuit includes at least four power amplifiers, i.e., two power amplifiers supporting a mid-frequency band and two power amplifiers supporting a high-frequency band. An uplink frequency band corresponding to a Mid Band (MB) is 1710-2200 MHZ, and an uplink frequency band corresponding to a High Band (HB) is 2300-2690 MHz. Each branch is provided with a single-frequency-band duplexer or filter, for example, one branch is a B7 duplexer, one branch is a B40 filter, one branch is a B41 filter, one branch is a B1 duplexer, and the like, and the details are not repeated for each branch.

Following the above-described description, different duplexers or filters need to be configured for different inter-band carrier aggregations, multiple power amplifier switches (PA switches) and filter switches (FSW) need to be disposed between the power amplifier and the duplexer, moreover, multiple antenna switch (ASW) ports need to be connected between the duplexer and the antenna, and the access of the inter-band carrier aggregation is implemented by turning on two or more power amplifiers and duplexers simultaneously. However, the circuit is complex, during the design process, the impedance of each duplexer needs to be specially and optimally designed to ensure the performance of inter-frequency-band carrier aggregation. Even if the impedance optimization is performed, the insertion loss during the inter-band carrier aggregation will be 0.5 dB worse than the insertion loss during non-carrier aggregation, which is the loss caused by mismatch during the inter-band carrier aggregation. In the inter-band carrier aggregation mode, multiple power amplifiers need to work simultaneously. Generally, the number of power amplifiers is consistent with the number of frequency bands of carrier aggregation, which increases the complexity of the circuit and additional power consumption. Therefore, there is a need for an inter-band carrier aggregation circuit capable of solving the above-described problems.

EMBODIMENT ONE

Figure 2:
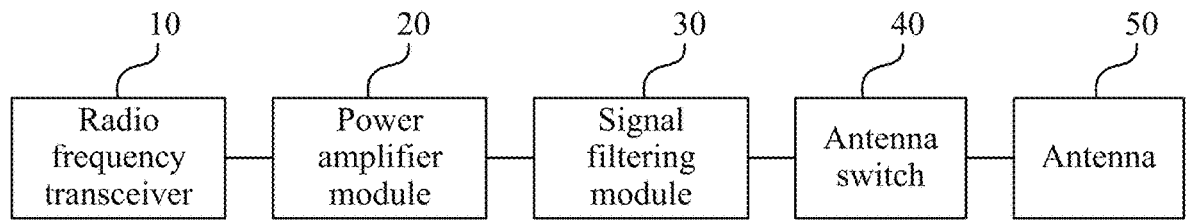
FIG. 2 is a schematic structural diagram of an inter-band carrier aggregation circuit according to an embodiment one of the present disclosure.

FIG. 2 is a schematic structural diagram of an inter-band carrier aggregation circuit according to an embodiment one of the present disclosure, and this method may be applied to a condition of performing an inter-band carrier aggregation on signals between different frequency bands. As shown in FIG. 2, the circuit includes a radio frequency transceiver 10, a power amplifier module 20, a signal filtering module 30, an antenna switch 40 and an antenna 50. The power amplifier module 20 is connected in series between the radio frequency transceiver 10 and the signal filtering module 30, and the power amplifier module 20 is configured to perform an amplification processing on a carrier aggregation signal output by the radio frequency transceiver to obtain an aggregate amplified signal, where the carrier aggregation signal includes signals of at least two different frequency bands. The signal filtering module 30 is connected in series between the power amplifier module 20 and the antenna switch 40, and the antenna switch 40 is connected to the antenna 50, the signal filtering module 30 includes at least one multiplexer 31 integrated by at least two single-frequency-band duplexers or filters, a multiplexer of the at least one multiplexer 31 includes a transmitting end, a receiving end, and an antenna end. The signal filtering module 30 is configured to filter the aggregate amplified signal and transmit carrier aggregation signal obtained by filtering to the antenna 50 through the antenna switch 40.

The carrier aggregation signal may be understood as a signal for which carrier aggregation is desired, and for example, the carrier aggregation signal may be two or more mid-frequency signals, two or more high-frequency signals, or one or more mid-frequency signals and one or more high-frequency signals. When the carrier aggregation signal is the mid-frequency signal, the circuit is configured to implement a carrier aggregation between mid-frequency signals. When the carrier aggregation signal is the high-frequency signal, the circuit is configured to implement a carrier aggregation between high-frequency signals. When the carrier aggregation signal includes the mid-frequency signal and the high-frequency signal, the circuit is configured to implement a carrier aggregation between the mid-frequency signal and the high-frequency signal.

In some embodiments, Table 1 shows a correspondence between a frequency band number and a frequency. As shown in Table 1, the frequency band number B1 corresponds to the uplink frequency band of 1920-1980 MHz, corresponds to the frequency band range of MB, and corresponds to the duplex mode as frequency division duplexing (FDD). The frequency band number B40 corresponds to the uplink frequency band of 2300-2400 MHZ, corresponds to the frequency band range of HB, and corresponds to the duplex mode as time division duplexing (TDD). Among them, the FDD mode means that the uplink and the downlink work at two separate frequencies, the reception and transmission in the mobile communication system of the TDD mode are different slots of the carrier in the same frequency channel, and the uplink and downlink are separated by guaranteed time. The contents in the table are not listed here. Carrier aggregation conditions included in this embodiment may be different carrier aggregation manners such as B1+B3, B2+B4, B25+B66, B7+B40, B40+B41, B1+B3+B7, B4/66+B2/25+B7, B1+B3+B40+B41, B4/66+B2/25+B40+B41, B2/25+B40, and B2/25+B41.

TABLE 1

| Frequency band number | Uplink frequency band (MHz) | Frequency band range | Duplex mode |
|---|---|---|---|
| B1 | 1920-1980 | MB | FDD |
| B2 | 1850-1910 | MB | FDD |
| B3 | 1710-1785 | MB | FDD |
| B4 | 1710-1755 | MB | FDD |
| B7 | 2500-2570 | HB | FDD |
| B25 | 1850-1915 | MB | FDD |
| B66 | 1710-1780 | MB | FDD |
| B40 | 2300-2400 | HB | TDD |
| B41 | 2496-2690 | HB | TDD |

It is to be noted that the circuit provided in this embodiment can achieve the carrier aggregation in various frequency bands, including but not limited to the frequency bands listed in Table 1.

In this embodiment, the radio frequency transceiver 10 is configured to output the carrier aggregation signal, and the power amplifier module 20 is connected in series between the radio frequency transceiver 10 and the signal filtering module 30. It is to be understood that an output terminal of the radio frequency transceiver 10 is connected to one end of the power amplifier module 20, and the radio frequency transceiver 10 outputs the carrier aggregation signal to the power amplifier module 20 through the output terminal. The power amplifier module 20 is configured to perform an amplification processing on the carrier aggregation signal output by the radio frequency transceiver and record the amplified signal as the aggregate amplified signal.

In some embodiments, the power amplifier module 20 may include a power amplifier, and the power amplifier may be a power amplifier that supports the mid-frequency band, a power amplifier that supports the high-frequency band, or a power amplifier that supports the mid-frequency and high-frequency bands. For achieving the carrier aggregation of different frequency bands, different types of power amplifiers may be adopted to satisfy the requirement of amplifying the carrier aggregation signal.

In this embodiment, the signal filtering module 30 is connected in series between the power amplifier module 20 and the antenna switch 40, and it may be considered that the other end of the power amplifier module 20 is connected to one end of the signal filtering module 30, the other end of the signal filtering module 30 is connected to one end of the antenna switch 40, and the other end of the antenna switch 40 is connected to the antenna 50. The signal filtering module 30 is configured to screen and filter the aggregate amplified signal to screen out a frequency band signal to which carrier aggregation is desired as the carrier aggregation signal, and the carrier aggregation signal is transmitted by the signal filtering module 30 to the antenna 50 through the antenna switch 40.

It is considered that in the related art, multiple single-frequency-band duplexers are used to screen the carrier aggregation signals, respectively. For example, when one frequency band signal and one frequency band signal are performed the inter-band carrier aggregation, two duplexers are required to screen and filter the carrier aggregation signals, respectively, the number of duplexers used is large, and other devices connected to the duplexers are also large; alternatively, when multiple frequency band signals are performed the inter-band carrier aggregation, multiple duplexers are required to screen and filter the signals, respectively, and more power amplifiers, more amplifier switches, more filters, more filter switches, more antenna switch channels and the like are required, thereby resulting in an increase in the area and the power consumption of the radio frequency front-end chip.

In order to solve the above-described problems, in this embodiment, the signal filtering module 30 includes one or several multiplexers. Multiple single-frequency-band discrete duplexers are integrated into a multiplexer with one transmitting end, one receiving end and one antenna end, so that the purposes of reducing the number of active devices such as power amplifiers, simplifying the amplifier switch corresponding to the power amplifier, the filter, the filter switch, and reducing the number of antenna switch channels are achieved.

In some embodiments, frequency band numbers involved in carrier aggregation between mid-frequency signals mainly include B1, B2, B3, B4, B25 and B66. In order to achieve the carrier aggregation between the mid-frequency signal and the mid-frequency signal, the duplexers of B1 and B3 and the duplexers of B2/B25 and B4/B66 may be integrated into two quadruplexers, and each quadruplexer maintains one transmitting end, one receiving end and one antenna end. When the inter-frequency-band carrier aggregation is performed between the mid-frequency band of B1_B3 or the mid-frequency band of B4/66_B2/25, an inter-frequency-band carrier aggregation signal is sent from the same channel at the transmitting end of the radio frequency transceiver, and the signal includes signals of two different frequency bands, i.e., B1_B3 or B4/66_B2/25. The signals only need to be performed an amplification processing by one power amplifier supporting the mid-frequency, one of paths is selected to be turned on by means of the amplifier switch corresponding to the power amplifier, and then the signals are directly transmitted to a transmitting end of the quadruplexer. When the signals are transmitted to the transmitting end of the quadruplexer, the signals may be screened according to different filters and may be filtered accordingly, and filtered signals may be re-aggregated at the antenna end of the quadruplexer. Since the antenna switch 40 belongs to a wide band device, two different signals may enter the antenna switch simultaneously and may be transmitted through port of one of the paths.

In some embodiments, frequency band numbers involved in carrier aggregation between high-frequency signals mainly include B7, B40 and B41. In order to achieve the carrier aggregation between the high-frequency signal and the high-frequency signal, the filters of B40 and B41 may be integrated into one duplexer, and the one duplexer maintains one transmitting end, one receiving end and one antenna end. For example, in the B40_B41 carrier aggregation of high-frequency band, only one amplifier supporting the high frequency is required, so that the power consumption during carrier aggregation between the radio frequency front-end transmission bands can be reduced, one amplifier switch and two filter switches are omitted, the area of the radio frequency front-end chip is reduced, moreover, only one duplexer is required to work, there is no need to turn on multiple frequency band channels simultaneously, and the impact of mismatch caused by simultaneous turn-on of the multiple channels is reduced.

Exemplarily, in order to achieve the carrier aggregation between the mid-frequency signal and the high-frequency signal, different single-frequency-band duplexers may be integrated into a hexaplexer and a two-frequency-band duplexer. For example, two hexaplexers of B1_B3_B7 and B2/25_B4/66_B7 and a diplexer of B40_B41 can achieve different forms of carrier aggregation combinations such as B1+B3+B7, B4/66+B2/25+B7, B1+B3+B40+B41, B4/66+B2/25+B40+B41, B2/25+B40, and B2/25+B41.

According to the inter-band carrier aggregation circuit provided in the embodiment of the present disclosure, the inter-band carrier aggregation circuit includes the radio frequency transceiver, the power amplifier module, the signal filtering module, the antenna switch and the antenna. The power amplifier module is connected in series between the radio frequency transceiver and the signal filtering module, and the power amplifier module is configured to perform the amplification processing on the carrier aggregation signal output by the radio frequency transceiver to obtain the aggregate amplified signal, where the carrier aggregation signal includes the signals of the at least two different frequency bands. The signal filtering module is connected in series between the power amplifier module and the antenna switch, the antenna switch is connected to the antenna, the signal filtering module includes the at least one multiplexer integrated by the at least two single-frequency-band duplexers or filters, the multiplexer includes the transmitting end, the receiving end and the antenna end, and the signal filtering module is configured to filter the aggregate amplified signal and transmit the carrier aggregation signal obtaining by filtering to the antenna through the antenna switch. According to the above-described technical solutions, multiple single-frequency-band discrete duplexers are integrated into a multiplexer with one transmitting end, one receiving end and one antenna end, and the inter-band carrier aggregation can be achieved based on a circuit including the multiplexer, so that the use of various discrete devices, the required device layout area, the line insertion loss, and the energy consumption of the circuit are reduced, and thus the overall cost of the circuit is reduced.

Figure 3:
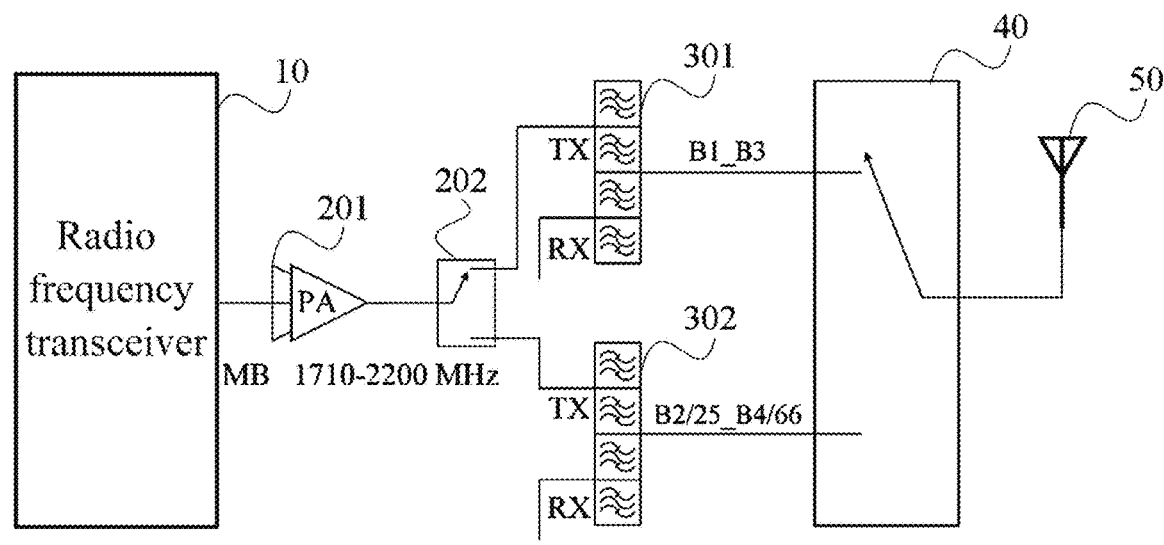
FIG. 3 is a schematic structural diagram of an inter-mid-frequency-band carrier aggregation circuit according to an embodiment one of the present disclosure.

FIG. 3 is a schematic structural diagram of an inter-mid-frequency-band carrier aggregation circuit according to an embodiment one of the present disclosure. As an optional embodiment of the present disclosure, on the basis of the embodiment one described above, the inter-band carrier aggregation circuit may be optimized for implementing the carrier aggregation between the mid-frequency signal and the mid-frequency signal. The power amplifier module 20 includes a first power amplifier 201 and a first amplifier switch 202, and the signal filtering module 30 includes a first quadruplexer 301 and a second quadruplexer 302. A first end of the first power amplifier 201 is connected to the radio frequency transceiver 10, a second end of the first power amplifier 201 is connected to a movable end of the first amplifier switch 202, a first fixed end of the first amplifier switch 202 is connected to a transmitting end of the first quadruplexer 301, and a second fixed end of the first amplifier switch 202 is connected to a transmitting end of the second quadruplexer 302.

This optional embodiment is provided to implement the carrier aggregation between the mid-frequency signal and the mid-frequency signal. The frequency band numbers involved in carrier aggregation between mid-frequency signals mainly include B1, B2, B3, B4, B25 and B66. The power amplifier module 20 is configured to perform an amplification processing on the carrier aggregation signal output by the radio frequency transceiver, and the amplification processing may be implemented by the power amplifier. Specifically, the power amplifier module 20 includes one power amplifier denoted as the first power amplifier 201 and one amplifier switch denoted as the first amplifier switch 202. The first power amplifier 201 supports a frequency band range of MB. In the drawings, the transmitting end is represented as TX, and the receiving end is represented as RX. For the receiving end, it is used when the downlink receives signals, and the details are not repeated here.

Different from the related art, the multiple single-frequency-band duplexers are used to screen the carrier aggregation signals, respectively. For example, when two mid-frequency signals are performed the inter-band carrier aggregation, the two duplexers are required to screen and filter the carrier aggregation signals, respectively, the number of duplexers used is large, and other devices connected to the duplexers are also large, thereby resulting in an increase in the area and the power consumption of the radio frequency front-end chip. In this embodiment, in order to achieve the inter-band carrier aggregation of the mid-frequency signal and the mid-frequency signal, the single-frequency-band duplexer is integrated into the quadruplexer, and the quadruplexer may be configured to screen and filter the two-frequency-band signals. It is considered that when the duplexer is integrated into the quadruplexer, if the transmitting end, the receiving end and the antenna end of each duplexer are retained, then more discrete devices such as power amplifiers are still connected to achieve the inter-band carrier aggregation function. In this embodiment, when two duplexers are integrated into the quadruplexer, so that each quadruplexer maintains only one transmitting end, only one receiving end and one antenna end.

Following the above-described description, in this embodiment, the duplexer capable of implementing the inter-band carrier aggregation is integrated into the quadruplexer. In order to cover the possible condition of inter-band carrier aggregation between mid-frequency signals, duplexers based on different frequency bands may be integrated into two quadruplexers, where the two quadruplexers are denoted as a first quadruplexer 301 and a second quadruplexer 302, respectively.

Preferably, the first quadruplexer is integrated by a B1 duplexer and a B3 duplexer, and the second quadruplexer is integrated by a B2/B25 duplexer and a B4/B66 duplexer. The B1 duplexer is specifically understood as a duplexer capable of screening a B1 frequency band signal, the B3 duplexer is specifically understood as a duplexer capable of screening a B3 frequency band signal, the B2 duplexer is specifically understood as a duplexer capable of screening a B2 frequency band signal, the B25 duplexer is specifically understood as a duplexer capable of screening a B25 frequency band signal, the B4 duplexer is specifically understood as a duplexer capable of screening a B4 frequency band signal, and the B66 duplexer is specifically understood as a duplexer capable of screening a B66 frequency band signal. In this embodiment, the B1 duplexer and the B3 duplexer may be integrated into one quadruplexer to form the first quadruplexer 301. The B2 duplexer and the B4 duplexer may be integrated into one quadruplexer to form the second quadruplexer 302. Alternatively, the B2 duplexer and the B66 duplexer may be integrated into one quadruplexer to form the second quadruplexer 302. Alternatively, the B25 duplexer and the B4 duplexer may be integrated into one quadruplexer to form the second quadruplexer 302. Alternatively, the B25 duplexer and the B66 duplexer may be integrated into one quadruplexer to form the second quadruplexer 302. It is to be noted that the duplexers of B1 and B3, and the duplexers of B2/B25 and B4/B66 are integrated into two quadruplexers, and each quadruplexer maintains one transmitting end, one receiving end, and one antenna end.

With continued reference to FIG. 3, further, it is also possible to optimize that an antenna end of the first quadruplexer 301 is connected to a first fixed end of the antenna switch 40, an antenna end of the second quadruplexer 302 is connected to a second fixed end of the antenna switch 40, and a movable end of the antenna switch 40 is connected to the antenna 50.

The antenna switch 40 includes two fixed ends and one movable end, and the two fixed ends are denoted as a first fixed end and a second fixed end, respectively. The antenna end of the first quadruplexer 301 is connected to the first fixed end of the antenna switch 40, the antenna end of the second quadruplexer 302 is connected to the second fixed end of the antenna switch 40, and the movable end of the antenna switch 40 is connected to the antenna 50. The movable end of the antenna switch 40 is switched, so that communication between the first quadruplexer 301 and the antenna 50 or communication between the second quadruplexer 302 and the antenna 50 can be achieved, that is, the switching of the conduction of two channels can be achieved by switching the antenna switch 40.

In the related art, two power amplifiers, two amplifier switches, three filter switches, three filters, and three antenna switch channels are required to implement an inter-frequency-band carrier aggregation of two mid-frequency signals. In this embodiment, only one power amplifier, one amplifier switch, two filters and two antenna switch channels are required to implement the carrier aggregation circuit between mid-frequency signals. In a case of inter-frequency-band carrier aggregation, it is only necessary to keep one main antenna switch in a turned-on state, one power amplifier working, and one transceiver transmitting signals. Compared with the solution of using one duplexer for each frequency band in the related art, one antenna switch channel can be reduced, that is, the design area of the antenna switch is reduced, and thus the insertion loss of the antenna switch is also reduced. Moreover, only one power amplifier and one amplifier switch are required in this embodiment, compared with the solutions in the related art, three filter switches are omitted, the area of the radio frequency front-end chip is reduced, and the omitting of the filter and the use of the quadruplexer can reduce the insertion loss during inter-band carrier aggregation between MBs by about 0.3 dB+0.5 dB=0.8 dB, moreover, for a condition of the non-carrier aggregation, it can be reduced by about 0.3 dB.

Based on the inter-band carrier aggregation circuit provided in this embodiment, a process of implementing the carrier aggregation between the mid-frequency signal and the mid-frequency signal may be described as follows: when the inter-frequency-band carrier aggregation is performed between the mid-frequency band of B1_B3 or the mid-frequency band of B4/66_B2/25, the inter-frequency-band carrier aggregation signal is sent from the same channel at the transmitting end of the radio frequency transceiver, and the signal includes signals of two different frequency bands, i.e., B1_B3 or B4/66_B2/25. The signals only need to be performed the amplification processing by one power amplifier of the mid-frequency, one of paths is selected to be turned on by means of the amplifier switch, and then the signals are directly transmitted to the transmitting end of the quadruplexer. When the signals are transmitted to the transmitting end of the quadruplexer, the signals may be screened according to different filters and may be filtered accordingly, and filtered signals may be re-aggregated at the antenna end of the quadruplexer. Since the antenna switch 40 belongs to the wide band device, two different signals may enter the antenna switch simultaneously and may be transmitted through port of one of the paths. When the inter-frequency-band carrier aggregation is performed between the mid-frequency band of B1_B3 or the mid-frequency band of B4/66_B2/25, compared with the solutions in the related art, only one power amplifier with the mid-frequency band needs to be turned on, whereby the power consumption during the mid-frequency-band carrier aggregation of the radio frequency front end is reduced, and moreover, only one quadruplexer needs to work, and multiple antenna switch channels need not be turned on simultaneously, whereby no loss caused by mismatch caused by the simultaneous turning on of the multiple channels exists.

Figure 4:
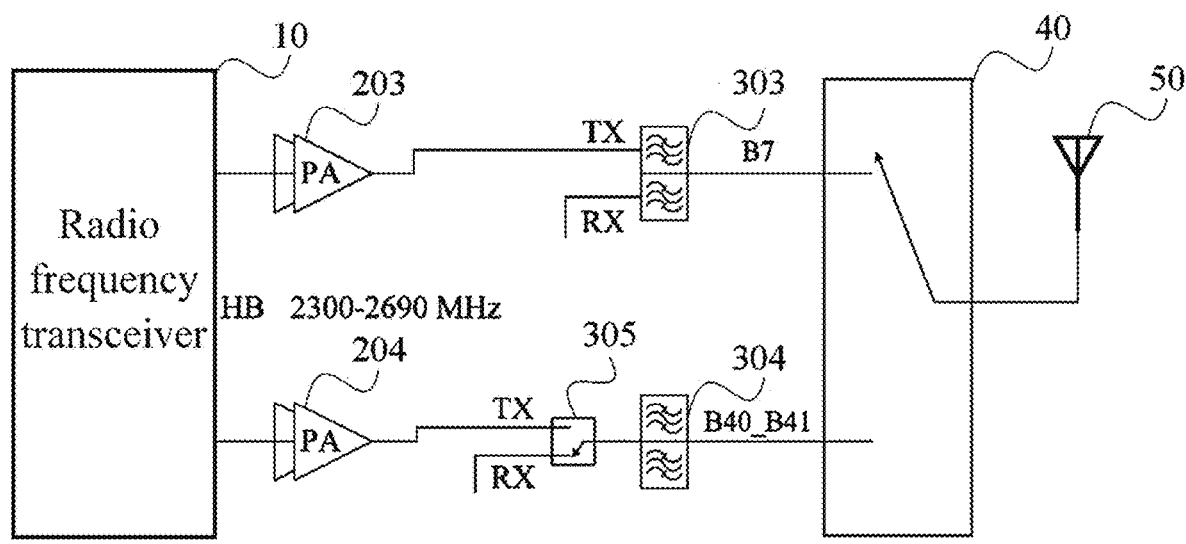
FIG. 4 is a schematic structural diagram of an inter-high-frequency-band carrier aggregation circuit according to an embodiment one of the present disclosure.

FIG. 4 is a schematic structural diagram of an inter-high-frequency-band carrier aggregation circuit according to an embodiment one of the present disclosure. As an optional embodiment of the present disclosure, on the basis of the embodiment one described above, the inter-band carrier aggregation circuit may be optimized for implementing the carrier aggregation between the high-frequency signal and the high-frequency signal. The power amplifier module 20 includes a second power amplifier 203 and a third power amplifier 204, and the signal filtering module includes a first duplexer 303, a first diplexer 304 and a first filter switch 305. A first end of the second power amplifier 203 is connected to the radio frequency transceiver 10, and a second end of the second power amplifier 203 is connected to a transmitting end of the first duplexer 303. A first end of the third power amplifier 204 is connected to the radio frequency transceiver 10, a second end of the third power amplifier 204 is connected to a transmitting fixed end of the first filter switch 305, and a movable end of the first filter switch 305 is connected to a transmitting end of the first diplexer 304.

This optional embodiment is provided to implement the carrier aggregation between the high-frequency signal and the high-frequency signal. The frequency band numbers involved in carrier aggregation between high-frequency signals mainly include B7, B40 and B41. The power amplifier module 20 is configured to perform an amplification processing on the carrier aggregation signal output by the radio frequency transceiver, and the amplification processing may be implemented by the power amplifier. Specifically, the power amplifier module 20 includes the first power amplifier 201 and the amplifier switch 202, the power amplifier module 20 may further include two power amplifiers, which are denoted as a second power amplifier 203 and a third power amplifier 204, respectively. The second power amplifier 203 and the third power amplifier 204 support a frequency band range of HB.

Different from the related art, the multiple single-frequency-band duplexers are used to screen the carrier aggregation signals, respectively. For example, when two high-frequency signals are performed the inter-band carrier aggregation, two duplexers are required to screen and filter the carrier aggregation signals, respectively, whereby the number of duplexers used is large, and other devices connected to the duplexers are also large, thereby resulting in an increase in the area and the power consumption of the radio frequency front-end chip. In this embodiment, in order to achieve the inter-band carrier aggregation of the high-frequency signal and the high-frequency signal, the single-frequency-band duplexer is integrated into the two-frequency-band duplexer, and the integrated duplexer may be configured to screen and filter the two-frequency-band signals. It is considered that when the single-frequency-band duplexer is integrated into the two-frequency-band duplexer, if the transmitting end, the receiving end and the antenna end of each duplexer are retained, then more discrete devices such as power amplifiers are still connected to achieve the inter-band carrier aggregation function. In this embodiment, when two single-frequency-band filters are integrated into the two-frequency-band duplexer, the integrated duplexer maintains only one transmitting end, one receiving end and one antenna end.

In this embodiment, the single-frequency-band duplexer capable of implementing the inter-band carrier aggregation is integrated into the two-frequency-band duplexer. In order to cover the possible condition of inter-band carrier aggregation between high-frequency signals, it is preferable that the first duplexer 303 is the B7 duplexer, and the first diplexer 304 is integrated by a B40 filter and a B41 filter. The B7 duplexer is specifically understood as a duplexer capable of filtering a B7 signal, the B40 filter is specifically understood as a filter capable of filtering a B40 signal, and the B41 filter is specifically understood as a filter capable of filtering a B41 signal. In this embodiment, the B7 duplexer is denoted as the first duplexer 303, and the B40 filter and the B41 filter are integrated into one diplexer and are denoted as the first diplexer 304. It is to be noted that the filters of B40 and B41 are integrated into one diplexer, the diplexer maintains one transmitting end, one receiving end, and one antenna end.

With continued reference to FIG. 4, further, it is possible to optimize that an antenna end of the first duplexer is connected to a third fixed end of the antenna switch, and an antenna end of the first diplexer is connected to a fourth fixed end of the antenna switch.

The antenna switch 40 further includes two fixed ends denoted as a third fixed end and a fourth fixed end, respectively. An antenna end of the first duplexer 303 is connected to a third fixed end of the antenna switch 40, and an antenna end of the first diplexer 304 is connected to a fourth fixed end of the antenna switch 40. The movable end of the antenna switch 40 is switched, so that communication between the first duplexer 303 and the antenna 50 or communication between the first diplexer 304 and the antenna 50 can be achieved, that is, the switching of the conduction of two channels can be achieved by switching the antenna switch 40.

In the related art, two power amplifiers, two amplifier switches, three filter switches, three filters and three antenna switch channels are required to implement an inter-frequency-band carrier aggregation of two high-frequency signals.

In this embodiment, the filters of B40 and B41 are integrated into one diplexer, and one transmitting end, one receiving end, and one antenna end are maintained. During the inter-high-frequency-band carrier aggregation, one filter can be omitted, and moreover, one matching circuit can be omitted, and one antenna switch port can be reduced. Here, the matching circuit may be understood as the circuit between the filter and the antenna switch and is configured to achieve the matching of the channels between the filter and the antenna switch, which is not shown in the drawings. In the B40_B41 carrier aggregation of high-frequency band, only one power amplifier supporting the high frequency is required, so that the power consumption during carrier aggregation between the radio frequency front-end transmission bands can be reduced, one amplifier switch and two filter switches are omitted, the area of the radio frequency front-end chip is reduced, moreover, only one duplexer is required to work, there is no need to turn on multiple frequency band channels simultaneously, the impact of mismatch caused by simultaneous turn-on of the multiple channels is reduced, and the omitting of the amplifier switch and the filter switch and the use of the duplexer can reduce the insertion loss during inter-band carrier aggregation of high-frequency band by about 0.3 dB+0.5 dB=0.8 dB. In B7_B40 carrier aggregation of high-frequency band, two amplifier switches and two filter switches are omitted, so that the insertion loss of CA can be reduced by about 0.3 dB.

Figure 5:
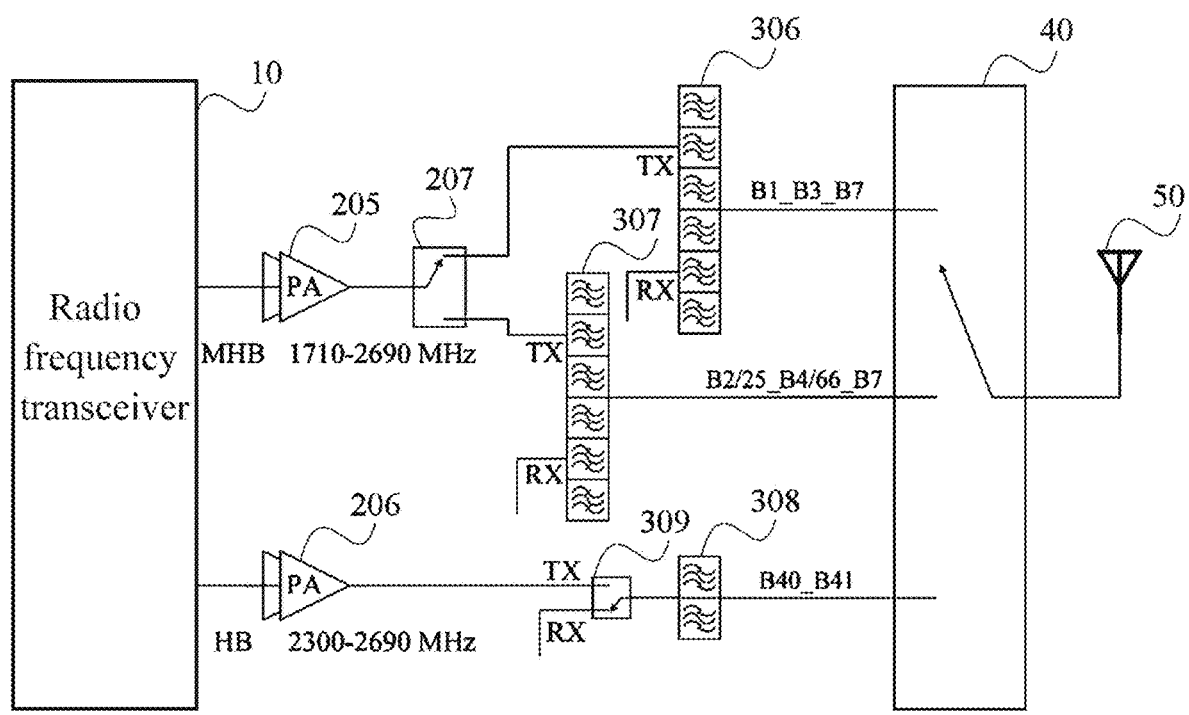
FIG. 5 is a schematic structural diagram of an inter-mid-high-frequency-band carrier aggregation circuit according to an embodiment one of the present disclosure.

FIG. 5 is a schematic structural diagram of an inter-mid-high-frequency-band carrier aggregation circuit according to an embodiment one of the present disclosure. As an optional embodiment of the present disclosure, on the basis of the embodiment one described above, the inter-band carrier aggregation circuit may be optimized for implementing a carrier aggregation between a mid-frequency signal and a high-frequency signal. The power amplifier module includes a fourth power amplifier 205, a fifth power amplifier 206, and a second amplifier switch 207, and the signal filtering module includes a first hexaplexer 306, a second hexaplexer 307, a second diplexer 308, and a second filter switch 309. A first end of the fourth power amplifier 205 is connected to the radio frequency transceiver 10, a second end of the fourth power amplifier 205 is connected to a movable end of the second amplifier switch 207, a first fixed end of the second amplifier switch 207 is connected to a transmitting end of the first hexaplexer 306, and a second fixed end of the second amplifier switch 207 is connected to a transmitting end of the second hexaplexer 307. A first end of the fifth power amplifier 206 is connected to the radio frequency transceiver 10, a second end of the fifth power amplifier 206 is connected to a transmitting fixed end of the second filter switch 309, and a movable end of the second filter switch 309 is connected to a transmitting end of the second diplexer 308.

This optional embodiment is provided to implement the carrier aggregation between the mid-frequency signal and the high-frequency signal. The mid-frequency band numbers involved in the carrier aggregation between the mid-frequency signal and the high-frequency signal mainly include B1, B2, B3, B25 and B66, and the high-frequency band signals involved mainly include B7, B40 and B41. The power amplifier module 20 is configured to perform an amplification processing on the carrier aggregation signal output by the radio frequency transceiver, and the amplification processing may be implemented by the power amplifier. Specifically, the power amplifier module 20 further includes two power amplifiers denoted as a fourth power amplifier 205 and a fifth power amplifier 206, respectively, and one amplifier switch denoted as a second amplifier switch 207. The fourth power amplifier 205 supports a frequency band range of MHB. The fifth power amplifier 206 supports a frequency band range of HB.

Different from the related art, the multiple single-frequency-band duplexers are used to screen the carrier aggregation signals, respectively. For example, when one mid-frequency signal and one high-frequency signal are performed the inter-band carrier aggregation, two duplexers are required to screen and filter the carrier aggregation signals, respectively, whereby the number of duplexers used is large, and other devices connected to the duplexers are also large, thereby resulting in an increase in the area and the power consumption of the radio frequency front-end chip. Alternatively, when multiple mid-frequency and high-frequency signals are performed the inter-band carrier aggregation, multiple duplexers are required to screen and filter the signals, respectively, and more discrete devices are required. In this embodiment, in order to achieve the inter-band carrier aggregation of the mid-frequency signal and the high-frequency signal, the single-frequency-band duplexer is integrated into the hexaplexer, and the hexaplexer may be configured to screen and filter the three-frequency-band signals. It is considered that when the duplexer is integrated into the hexaplexer, if the transmitting end, the receiving end and the antenna end of each duplexer are retained, then more discrete devices such as power amplifiers are still connected to achieve the inter-band carrier aggregation function. Therefore, in this embodiment, when three duplexers are integrated into the hexaplexer, only one transmitting end, one receiving end and one antenna end are maintained for each hexaplexer.

Following the above-described description, in this embodiment, duplexers of different frequency bands are integrated into two hexaplexers, and each hexaplexer can screen both the high-frequency signals and the mid-frequency signals. These two hexaplexers are denoted as the first hexaplexer and the second hexaplexer, respectively. Moreover, when two single-frequency-band filters are integrated into the two-frequency-band duplexers, the integrated duplexer maintains only one transmitting end, one receiving end and one antenna end. The duplexer may screen the high-frequency signals.

Preferably, the first hexaplexer 306 is integrated by the B1 duplexer, the B3 duplexer and the B7 duplexer, the second hexaplexer 307 is integrated by the B2/B25 duplexer, the B4/B66 duplexer and the B7 duplexer, and the second diplexer 308 is integrated by the B40 filter and the B41 filter.

In this embodiment, the B1 duplexer, the B3 duplexer and the B7 duplexer are integrated into one hexaplexer denoted as the first hexaplexer 306. The B2 duplexer, the B4 duplexer, and the B7 duplexer may be integrated into one hexaplexer to form the second hexaplexer 307. Alternatively, the B2 duplexer, the B66 duplexer and the B7 duplexer may be integrated into one hexaplexer to form the second hexaplexer 307. Alternatively, the B25 duplexer, the B4 duplexer, and the B7 duplexer may be integrated into one hexaplexer to form the second hexaplexer 307. Alternatively, the B25 duplexer, the B66 duplexer, and the B7 duplexer may be integrated into one hexaplexer to form the second hexaplexer 307. The B40 filter and the B41 filter are integrated into one diplexer denoted as the second diplexer 308. It is to be noted that the first hexaplexer, the second hexaplexer and the second diplexer have each only one transmitting end, one receiving end, and one antenna end.

With continued reference to FIG. 5, further, an antenna end of the first hexaplexer 306 is connected to a fifth fixed end of the antenna switch 40, an antenna end of the second hexaplexer 307 is connected to a sixth fixed end of the antenna switch, and an antenna end of the second diplexer 308 is connected to a seventh fixed end of the antenna switch 40.

Here, the antenna switch 40 further includes two fixed ends denoted as a fifth fixed end, a sixth fixed end and a seventh fixed end, respectively. The antenna end of the first hexaplexer 306 is connected to the fifth fixed end of the antenna switch 40, the antenna end of the second hexaplexer 307 is connected to the sixth fixed end of the antenna switch 40, and the antenna end of the second diplexer 308 is connected to the seventh fixed end of the antenna switch 40. The movable end of the antenna switch 40 is switched, so that communication between the first hexaplexer 306 and the antenna 50, communication between the second hexaplexer 307 and the antenna 50, or communication between the antenna end of the second diplexer 308 and the antenna switch 40 can be achieved, that is, the switching of the conduction of three channels can be achieved by switching the antenna switch 40.

In the related art, four power amplifiers, four amplifier switches, six filter switches, six filters, and six antenna switch channels are required to implement an inter-frequency-band carrier aggregation between the mid-frequency signal and the high-frequency signal. Different from the related art, an implementation mode of inter-band carrier aggregation of a mid-frequency signal and a high-frequency signal in this embodiment will be described below. The bandwidth supported by the power amplifier is expanded from the mid-frequency band to support both the mid-frequency band and the high-frequency band simultaneously, moreover, two hexaplexers of B1_B3_B7 and B2/25_B4/66_B7 and a diplexer of B40_B41 are added, so that different forms of carrier aggregation combinations such as B1+B3+B7, B4/66+B2/25+B7, B1+B3+B40+B41, B4/66+B2/25+B40+B41, B2/25+B40, and B2/25+B41 can be achieved. Only two power amplifiers, one amplifier switch, three filters, one filter switch and three antenna switch channels are required to implement the carrier aggregation circuit between the mid-frequency signal and the high-frequency signal. Compared with the related art, in the carrier aggregation circuit of the mid-frequency signal and the high-frequency signal provided in this embodiment, two power amplifiers are reduced, three amplifier switches are omitted, the number of filters is reduced from six to three, the number of filter switches is reduced from six to one, and the number of ports of antenna switches is reduced by three, thereby simplifying the circuit while reducing the area occupied by the device, reducing the area of the antenna switch, and reducing the insertion loss of antenna switches by about 0.1 dB. The reduction of the number of power amplifiers and the use of hexaplexers can make the insertion loss under inter-band carrier aggregation better, and the transmit power may be greater.

In some embodiments, when the inter-band CA of B1_B3_B7 is performed, only one power amplifier supporting the mid-frequency and high-frequency bands needs to be turned on, moreover, these frequency bands do not need to pass through the filter switch, and a condition that the mismatching between the frequency bands can not occur during the inter-band carrier aggregation. The omission of the filter switch and the use of the hexaplexer will reduce the insertion loss during the inter-mid-high-frequency-band carrier aggregation by about 0.3 dB+0.7 dB=1.0 dB.

It is to be noted that in the circuit provided in this optional embodiment, two hexaplexers and one duplexer are integrated, not only the carrier aggregation of the mid-frequency signal and the high-frequency signal can be achieved, but also the carrier aggregation of the mid-frequency signal and the mid-frequency signal can be achieved, and the carrier aggregation of the high-frequency signals and the high-frequency signals can be achieved.

The above description is an implementation of the transmission of the carrier aggregation. It is to be noted that, for the reception of carrier aggregation signals, the carrier aggregation signals are finally converged to the receiving end of the hexaplexer or the diplexer. For reception, a low noise amplifier (LNA) is involved. Since the LNA belongs to a broadband device, the LNA can amplify the received carrier aggregation signals indiscriminately, whereby the number of LNAs can also be reduced and the same effect can be achieved.

In order to more clearly state that the inter-band carrier aggregation circuit provided in this embodiment is superior to the inter-band carrier aggregation circuit in the related art, Table 2 shows the number of discrete devices used in the inter-band carrier aggregation circuit provided in this solution and the inter-band carrier aggregation circuit in the related art.

antenna switch channels is reduced, the dimension and power consumption of the radio frequency terminal chip are reduced, the integration of the whole system is more conducive, the functions of the previous complex system can be achieved by means of the simple active circuit, and the dependence on the active circuit can be alleviated. When the inter-band carrier aggregation, especially multi-frequency-band carrier aggregation, is achieved, the use of active devices is reduced, the required layout area of the devices is reduced, the insertion loss of lines is reduced, and the overall cost is reduced. Moreover, only one or two power amplifiers need to be turned on simultaneously during the inter-band carrier aggregation, thereby reducing the power consumption of the active circuit and improving the standby time of the terminal product. In the case of non-CA, the circuit provided in this embodiment also has the advantage of simplifying the circuit, however, in the existing conventional technology, the number of ports of the main switch is consistent with the number of supported frequency bands, and multiple power amplifiers and multiple amplifier switches are also required, in this technical solution, the power amplifier, the number of power amplifiers, the number of amplifier switches, the number of filters, the number of filter switches, and the number of ports of antenna switches can be reduced.

An embodiment of the present disclosure further provides a radio frequency front-end system, and the radio frequency

TABLE 2

| | Number of power amplifiers | Number of amplifier switches | Number of filters | Number of filter switches | Number of antenna switch channels | Reduced insertion loss (non-CA) | Reduced insertion loss (inter-frequency-band CA) |
|---|---|---|---|---|---|---|---|
| Previous solution (Inter-MB CA) | 2 | 2 | 3 | 3 | 3 | | |
| This solution (Inter-MB CA) | 1 | 1 | 2 | 0 | 2 | 0.3 dB | 0.3 dB |
| Previous solution (Inter-MHB CA) | 4 | 4 | 6 | 6 | 6 | | |
| This solution (Inter-MHB CA) | 2 | 1 | 3 | 1 | 3 | 0.5 dB | 1.0 dB |

As shown in Table 2, when the inter-MB CA is performed, compared with the previous existing solution, in this solution, the number of power amplifiers is reduced by one, the number of power amplifier switches is reduced by one, the number of filters is reduced by one, the number of filter switches is reduced by three, the number of switching channels is reduced by one, and the insertion loss is also reduced. For the inter-MHB CA, the number of power amplifiers is reduced by two, the number of power amplifier switches is reduced by three, the number of filters is reduced by three, the number of filter switches is reduced by five, the number of switching channels is reduced by three, and the insertion loss is also reduced.

It is to be understood that in the above-described technical solutions, the number of power amplifiers, filters, amplifier switches and filter switches used is reduced, the number of front-end system includes at least the inter-band carrier aggregation circuit provided in any of the embodiments of the present disclosure.

Since the radio frequency front-end system includes the radio frequency circuit provided in any of the embodiment of the present disclosure, the above-described radio frequency front-end system and the inter-band carrier aggregation circuit have the same beneficial effects, and the details are not be repeated here.

What is claimed is:

1. An inter-band carrier aggregation circuit, comprising a radio frequency transceiver, a power amplifier module, a signal filtering module, an antenna switch and an antenna, wherein, the power amplifier module is connected in series between the radio frequency transceiver and the signal filtering module, and the power amplifier module is configured to perform an amplification processing on a carrier aggregation signal output by the radio frequency transceiver to obtain an aggregate amplified signal, wherein the carrier aggregation signal comprises signals of at least two different frequency bands; and the signal filtering module is connected in series between the power amplifier module and the antenna switch, the antenna switch is connected to the antenna, the signal filtering module comprises at least one multiplexer integrated by at least two single-frequency-band duplexers or filters, a multiplexer of the at least one multiplexer comprises a transmitting end, a receiving end, and an antenna end, and the signal filtering module is configured to filter the aggregate amplified signal and transmit carrier aggregation signal obtained by filtering to the antenna through the antenna switch;

wherein in a case where the carrier aggregation signal comprises two mid-frequency signals, the inter-band carrier aggregation circuit is configured to implement a carrier aggregation between the mid-frequency signals;

the power amplifier module comprises a first power amplifier and a first amplifier switch, and the signal filtering module comprises a first quadruplexer and a second quadruplexer; and a first end of the first power amplifier is connected to the radio frequency transceiver, a second end of the first power amplifier is connected to a movable end of the first amplifier switch, a first fixed end of the first amplifier switch is connected to a transmitting end of the first quadruplexer, and a second fixed end of the first amplifier switch is connected to a transmitting end of the second quadruplexer.

2. The inter-band carrier aggregation circuit of claim 1, wherein an antenna end of the first quadruplexer is connected to a first fixed end of the antenna switch, an antenna end of the second quadruplexer is connected to a second fixed end of the antenna switch, and a movable end of the antenna switch is connected to the antenna.

3. The inter-band carrier aggregation circuit of claim 1, wherein in a case where the carrier aggregation signal comprises two high-frequency signals, the inter-band carrier aggregation circuit is configured to implement a carrier aggregation between the high-frequency signals;

the power amplifier module further comprises a second power amplifier and a third power amplifier, and the signal filtering module further comprises a first duplexer, a first diplexer and a first filter switch;

a first end of the second power amplifier is connected to the radio frequency transceiver, and a second end of the second power amplifier is connected to a transmitting end of the first duplexer; and a first end of the third power amplifier is connected to the radio frequency transceiver, a second end of the third power amplifier is connected to a transmitting fixed end of the first filter switch, and a movable end of the first filter switch is connected to a transmitting end of the first diplexer.

4. The inter-band carrier aggregation circuit of claim 3, wherein an antenna end of the first duplexer is connected to a third fixed end of the antenna switch, and an antenna end of the first diplexer is connected to a fourth fixed end of the antenna switch.

5. The inter-band carrier aggregation circuit of claim 1, wherein in a case where the carrier aggregation signal comprises a mid-frequency signal and a high-frequency signal, the inter-band carrier aggregation circuit is configured to implement a carrier aggregation between the mid-frequency signal and the high-frequency signal;

the power amplifier module further comprises a fourth power amplifier, a fifth power amplifier and a second amplifier switch, and the signal filtering module further comprises a first hexaplexer, a second hexaplexer, a second diplexer and a second filter switch;

a first end of the fourth power amplifier is connected to the radio frequency transceiver, a second end of the fourth power amplifier is connected to a movable end of the second amplifier switch, a first fixed end of the second amplifier switch is connected to a transmitting end of the first hexaplexer, and a second fixed end of the second amplifier switch is connected to a transmitting end of the second hexaplexer; and a first end of the fifth power amplifier is connected to the radio frequency transceiver, a second end of the fifth power amplifier is connected to a transmitting fixed end of the second filter switch, and a movable end of the second filter switch is connected to a transmitting end of the second diplexer.

6. The inter-band carrier aggregation circuit of claim 5, wherein an antenna end of the first hexaplexer is connected to a fifth fixed end of the antenna switch, an antenna end of the second hexaplexer connected to a sixth fixed end of the antenna switch, and an antenna end of the second diplexer is connected to a seventh fixed end of the antenna switch.

7. The inter-band carrier aggregation circuit of claim 1, wherein the first quadruplexer is integrated by a B1 duplexer and a B3 duplexer, and the second quadruplexer is integrated by a B2/B25 duplexer and a B4/B66 duplexer.

8. The inter-band carrier aggregation circuit of claim 3, wherein the first duplexer is a B7 duplexer, and the first diplexer is integrated by a B40 filter and a B41 filter.

9. The inter-band carrier aggregation circuit of claim 5, wherein the first hexaplexer is integrated by a B1 duplexer, a B3 duplexer and a B7 duplexer, the second hexaplexer is integrated by a B2/B25 duplexer, a B4/B6 duplexer and a B7 duplexer, and the second diplexer is integrated by a B40 filter and a B41 filter.

* * * * *